United States Patent [19]

Barch et al.

[11] 4,305,742
[45] Dec. 15, 1981

[54] METHOD OF FORMING AND SIZING GLASS FIBERS

[75] Inventors: Herbert W. Barch, Natrona Heights; Howard J. Hudson, Braddock, both of Pa.; Jerry C. Hedden, Shelby, N.C.

[73] Assignee: PPG Industries, Inc., Pittsburgh, Pa.

[21] Appl. No.: 222,452

[22] Filed: Jan. 5, 1981

Related U.S. Application Data

[63] Continuation of Ser. No. 41,269, May 21, 1979, abandoned.

[51] Int. Cl.$^3$ .............................................. C03C 25/02
[52] U.S. Cl. .................................... 65/3.43; 106/238; 427/178; 427/434.6; 428/288
[58] Field of Search ......................... 65/3.43; 428/308; 106/238; 427/178, 434.6

[56] References Cited

U.S. PATENT DOCUMENTS

| | | | |
|---|---|---|---|
| 3,336,253 | 8/1967 | Wong et al. | 266/29.2 |
| 3,367,587 | 2/1968 | Klink et al. | 65/2 |
| 3,371,877 | 3/1968 | Klink et al. | 65/2 |
| 3,437,517 | 4/1969 | Eilerman et al. | 65/3.43 |
| 3,459,585 | 8/1969 | Killmeyer et al. | 65/3.43 |
| 3,475,149 | 10/1969 | Eckerle et al. | 65/3.43 |
| 3,562,081 | 2/1971 | Stalege | 161/193 |
| 3,567,570 | 3/1971 | Preston et al. | 161/193 |
| 3,652,326 | 3/1972 | Ward | 260/830 TW |
| 3,779,981 | 12/1973 | Ward | 260/40 R |
| 3,817,898 | 6/1974 | Ward | 260/29.6 NR |
| 3,827,230 | 8/1974 | Marzocchi et al. | 57/140 G |
| 3,935,344 | 1/1976 | Haggerty et al. | 428/378 |
| 3,997,306 | 12/1976 | Hedden | 65/3.43 |
| 3,998,404 | 12/1976 | Reese | 242/158.3 |
| 4,065,417 | 12/1977 | Wong et al. | 260/17.4 CL |

*Primary Examiner*—Robert L. Lindsay, Jr.
*Attorney, Agent, or Firm*—Kenneth J. Stachel

[57] ABSTRACT

A sizing composition and process are provided for producing wound packages and particularly precision wound packages of glass fiber strand and/or roving. The sizing composition has a total solids content in the range of about 9 to about 30 weight percent and comprises a phenolic epoxy resin, the reaction product of a partial ester of a polycarboxylic acid containing one or more unesterified carboxyl groups with a compound containing more than one epoxy group; and organo silane or silanes; a non-ionic surface active agent; a protective colloid; and a cationic lubricant. The process for producing the precision wound packages of glass fibers includes forming a plurality of glass fibers from molten glass, treating the glass fibers with the sizing composition having a total solids content of about 9 to about 30 weight percent, gathering the treated glass fibers together into one or more strands and collecting the gathered strand or strands on a winder in a precision wound package to produce glass fiber strands or roving.

9 Claims, No Drawings

METHOD OF FORMING AND SIZING GLASS FIBERS

This is a continuation of application Ser. No. 41,269, filed May 21, 1979 now abandoned.

BACKGROUND OF THE INVENTION

The present invention is directed to an aqueous sizing composition for treating glass fibers and a process for making sized glass fiber strands. More particularly, the present invention is related to a sizing composition useful in sizing glass fibers so as to improve the process of formation of precision wound packages of glass fiber strands for use in polymeric reinforcement.

Sizing compositions are used in producing glass fibers in order to protect the glass fiber strand in subsequent processing and, where the glass fibers are to be used in plastic reinforcement, to provide adhesion between the glass fibers and the polymer matrix. The sizing composition is generally applied to the glass fiber strands after the multitude of fine glass filaments that are combined to make up the strand are formed by the rapid attenuation from molten cones of glass at the tips of small orifices in a bushing. After the filaments have been treated with the sizing composition and gathered together into a strand or strands, the glass fiber strand is wound around a rapidly rotating drum to form the package.

For use in the reinforcement of polymer matrices the sized and wound glass fiber strands can be made into roving, chopped strand or mat. Roving is formed by mounting a plurality of glass fiber forming packages on a creel or support and gathering the strands from the separate packages in parallel, to form a rope or roving. This braided rope or roving is wound on a rotating drum to collect the roving. The roving so produced has a plurality of uses. It cain be chopped and separated to form separated chopped strand, or it can be woven to form woven roving, or it can be used by merely unwinding and impregnating the roving with resin for applications such as filament winding and pultrusion. In order to obtain a glass fiber roving which is useful for reinforcement, it is desirable that the formation and processing of the roving must present as few problems as possible in production. In this regard it was recently suggested in U.S. Pat. No. 3,997,306 (Hedden) to use a sizing composition in the formation of glass fiber strand to be used in polymer reinforcement that could be used in many types of polymers such as epoxy, polyester, and vinyl ester resin matrices.

The sizing composition of U.S. Pat. No. 3,997,306 (Hedden) comprises a phenolic epoxy resin, the reaction product of a partial ester of a polycarboxylic acid, which contained one or more unesterified carboxyl groups, with a compound containing more than one epoxy group, a glass fiber lubricant, sufficient emulsifiers or wetting agents to make a homogeneous mixture, an amino silane coupling agent and a methacryloxyalkyltrialkoxysilane coupling agent. The desired pH range for the size is between about 5.5 and 7.5 with an optimum solids concentration of 4.0 to 6.0 percent.

In addition to producing rovings from forming packages of glass fiber strand, the art has developed the method and necessary apparatus for formation of precision wound packages of glass fiber strands during the fiber forming process while the winding still provides the attenuation necessary to form the glass filament from the glass fiber bushing. The finished package is normally cylindrical in shape and should have a flat surface with flat edges on either end. The package can be one having single strand roving or one where the roving may comprise multiple strands, but in both the roving is compact at the end regions of the package thereby providing the cylindrical shape of the package.

In producing the precision wound packages of glass fiber strands and roving, the strand or roving of the packages contain considerable quantities of water, usually around 10 to 15 percent by weight, because they are wound during fiber glass forming operations wherein an aqueous sizing composition is used. The packages containing the glass fiber strand or roving with such a high quantity of water must be dried before shipment. One process for producing a precision wound package of glass fiber strand or roving, having a reduced moisture content involves the following steps. The filaments are drawn from the glass fiber forming bushing which is supplied continuously with molten glass. The drawn glass fiber filaments are treated with a suitable sizing composition from an aqueous sizing composition bath by drawing them over an applicator which places the sizing composition on the filaments. The filaments are then passed through a drying zone to reduce the moisture content to 8 percent by weight or less. The dried filaments are then gathered into a strand and the strand is wound on a winder having a horizontal traversing guide vehicle and guide eye constructed so that edge distortion is reduced in the package being wound. The precision wound packages are then removed and dried to completion in a drying oven.

It is an object of the present invention to provide a sizing composition for use with glass fibers that permits the treated glass fibers to be used as reinforcement in polymeric matrices such as epoxy, polyesters, and vinyl ester wherein the need for drying the treated glass fiber is reduced.

It is an additional object of the present invention to provide a sizing composition for treating glass fibers that are to be wound during the fiber forming process directly into precision wound packages of glass fiber strand or roving to be used in polymer reinforcement wherein the need for drying the precision wound packages is reduced.

It is another further object of the present invention to provide an improved process for producing precision wound packages of glass fibers strand or roving during the fiber forming process.

It is a further additional object of the present invention to provide a sizing composition for treating glass fibers to be used in polymer reinforcement wherein the sizing composition controls the moisture of the treated glass fiber strand.

SUMMARY OF THE INVENTION

The foregoing objects of the invention are accomplished by a sizing composition comprising a phenolic epoxy resin, the reaction product of a partial ester of polycarboxylic acid which contains one or more unesterified carboxyl groups with a compound containing more than one epoxy group, a glass fiber lubricant, sufficient emulsifiers or wetting agents to impart a homogeneous mixture, and one or more silane coupling agents and a sufficient amount of water to yield a sizing composition having a total solids content in the range of about 9 to about 30 weight percent.

The process of the present invention that accomplishes the foregoing objects of the invention comprises drawing glass fiber streams through orifices in a bushing to form individual glass fibers, moving the glass fibers away from the bushing at a rate of speed sufficient to attenuate the fibers to the desired filament diameter, applying to the fibers while they are moving at this speed and before they are formed into strands the aforementioned high solids sizing composition, gathering the treated glass fibers into strands, and winding the treated glass fiber strands into a precision wound package of glass fiber strands or roving. This process significantly reduces the strand moisture loading and eliminates the need for partial drying of the glass fibers after they have been treated with an aqueous sizing composition and before they are wound into a precision wound package.

DETAILED DESCRIPTION OF THE INVENTION

The phenolic epoxy resins and reaction product of a partial ester of a polycarboxylic acid with a compound containing one or more epoxy groups, lubricant, emulsifiers or wetting agents and coupling agents that are useful in the practice of the present invention are essentially those described in U.S. Pat. No. 3,997,306, hereby incorporated by reference.

The phenolic epoxy resins that are useful are typically epoxy resins which are obtained by the reaction of a stoichiometric excess of an epihalohydrin, such as epichlorohydrin with polyhydric phenol, such as bis (4-hydroxyphenyl) 2,2 propane, bis (hydroxyphenyl) methane. This compound is obtained by the acid condensation of two moles of phenol with one mole of formaldehyde, but other phenols like polyhydric phenols such as hydroquinone, resorcinol, and the like can be used. Such compounds are characterized by their phenolic backbone and also the presence of terminal epoxy groups. These compounds are further described in U.S. Pat. Nos. 2,324,483; 2,444,333; 2,494,295; 2,500,600; and 2,511,913. The disclosures of which are incorporated herein by reference. By varying the proportions of the reactants and/or the reaction conditions compounds of low, intermediate or higher molecular weights may be produced which range from liquids to solids. Typically the molecular weights range between 300 and 900 and more preferably, between 300 and 400. These epoxy resins are used in an amount from about 3.4 to 11.5 percent by weight based on the total weight of the sizing composition. These epoxy resins are effective film formers and the epoxy functionality aids in the bonding of the glass fibers to the polymer matrix. Also it is desired that the epoxy resins have such characteristics to be soluble in the polymer matrix thereby imparting maximum compatibility between the glass fibers and the polymer resins such as polyester resin, epoxy resin and vinyl ester resin, that is to be reinforced.

The reaction product of the partial ester of a polycarboxylic acid, which contains one or more unesterified carboxyl groups, with a compound containing more than one epoxy group is formed by reactions known to those skilled in the art. Such reaction products are taught in U.S. Pat. No. 3,437,517. A preferred class of compounds which contain more than one epoxy group per molecule comprises diepoxy compounds containing at least one fused ring epoxy group, i.e., one of the epoxy groups being attached to adjacent carbon atoms which are located in a carbocyclic structure such as epoxies that are disclosed in U.S. Pat. No. 3,437,517, incorporated herein by reference. Polycarboxylic acids which may be used in preparing a polycarboxylic partial ester that contains at least one unesterified carboxyl group include for example, oxalic, malonic, succinic, glutaric, adipic, suberic, azelaic, sebasic, maleic, fumaric, itaconic, citraconic and the like. The term "acid" as used herein and in the claims shall include the acid anhydrides where they exist. Characteristically, the final reaction product is that of carboxylic acid, which contains at least one unesterified carboxyl group, with a compound containing more than one epoxy group. A non-exclusive example of the reaction product is the reaction product of maleic anhydride and the monomethyl ether of polyoxyethylene glycol, said glycol having a molecular weight of 750 and is having a molecular weight of 750 and is further reacted with 3 epoxycyclohexylmethyl 3,4-epoxy cyclohexane carboxylate. This partial ester of a polycarboxylic acid with the epoxy compound is used in an amount from about 0.56 to about 1.9 percent by weight based on the total weight of the sizing composition.

The coupling agents or coupling agent system which can be used to promote bonding between the polymer matrices and the glass fibers can be one or more organo silanes selected from the group including silane and siloxane materials such as hydrolyzable vinyl, allyl, beta-chloropropyl, phenyl, thioalkyl, thioalkaryl, amino alkyl, methacrylate, epoxy and mercapto silanes, their hydrolysis products and polymers of the hydrolysis products and mixtures of any of these are suitable for such use. Some of the silanes are disclosed in the following U.S. Pat. Nos. 2,563,288; 2,688,006; 2,688,007; 2,723,211; 2,742,378; 2,754,237; 2,776,910; 2,799,598; 2,832,754; 2,930,809; 2,946,701; 2,952,576; 2,974,062; 3,044,036; 3,169,884; 3,207,623 and 3,211,684, the disclosures of which are incorporated herein by reference. A coupling agent system which has been found useful in promoting bonding between the polymer matrices and the glass fibers is a dual silane coupling agent system. Typically, the silane coupling agents have one portion of the molecule composed of highly hydrolizable groups such as Si-OR wherein R is alkyl group having 1 to 5 carbon atoms, preferably 1 to 2 carbon atoms. The other portion of the silane molecule has a reactive group thereon which is a functional organic group, for example, an amino or an acrylic group. The epoxy silane and the acrylic silane are both used in the sizing composition of the invention each in the range of about 0.4 to about 1.4 percent by weight based on the total weight of the size with a range of total silane concentration of about 0.5 to about 3.5 percent by weight. Typical epoxy silane coupling agents are, but are not limited to, gamma-glycidoxy propyltriethoxy silane, gamma-glycidoxy propyltrimethoxy silane, beta-(3,4-epoxycyclohexyl) ethyltrimethoxysilane and other epoxyalkyltrialkoxysilanes, having the formula

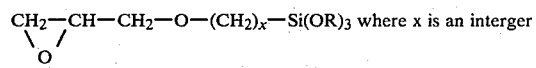

from 2 to 5 and R is an alkyl group containing 1 to 5 carbon atoms, or the corresponding hydrolysis products thereof. Unsaturated silanes which have been found particularly useful in the practice of the invention are methacryloxyalkyltrialroxysilanes and particularly gamma-methacryloxypropyltrimethoxysilane.

When the coupling agent system is used, the methoxy groups are hydrolyzed prior to incorporation of the methacrylate coupling agent into the sizing composition. The hydrolysis is accomplished by mixing acetic acid, water and the silane and stirring for a sufficient time and temperature to hydrolyze the Si-OCH$_3$ group to form methanol and silanol-SiOH.

Non-ionic surface active agents are added to the sizing composition to impart wettability of the size to the glass and to render the water immiscible portion of the sizing composition emulsifiable. The non-ionic surface active agents acting as emulsifiers are polyalkylene glycols formed of mixed alkylene oxides, alkylphenoxyalkyleneoxyalkanols and polyoxyalkylated vegetable oils. A particularly useful polyalkylene glycol emulsifier is an ethylene oxide-propylene glycol reaction product having a hydroxyl number of 6 to 10 and a melting point of 55° to 57° C. sold as FC-180 manufactured by Whitestone Chemical Co. The alkylphenoxypolyalkyleneoxyalkanol which has found utility in this practice of the invention is octylphenoxypolyethyleneoxyethanol sold by Rohm and Haas Co. as IGEPAL CA630. A polyoxyalkylated vegetable oil which aids in the emulsification of the water immiscible constituents of the size is polyoxyethylated vegetable oil sold by GAF Corporation under the name of EMULPHOR EL-719. The emulsifier and wetting agent concentration should range between 1.04 and 3.6 percent based on the total weight of the size.

Other known glass fiber sizing ingredients may be added to the composition of the invention including cationic lubricants, nonionic lubricants, protective colloids, plasticizers, anti-foaming agents and the like. The cationic lubricant is typically the amine salt of a fatty acid. It is preferable that the fatty acid moiety of the salt has between about 12 and 22 carbon atoms. The amines useful for forming the salt are tertiary amines of substantially low molecular weight, i.e., the alkyl groups attached to the nitrogen atom should have between 1 and 6 carbon atoms. This cationic lubricant aids in the processing of the glass fiber strand and the roving formed therefrom by imparting slip to the exterior of the strand or roving as it passes over various types of processing equipment. The cationic lubricant is used at a level of about 0.09 to 0.32 percent by weight based on the total weight of the size.

The plasticizers, typically polyethylene glycols with a relatively low molecular weight may be incorporated into the sizing composition at a level of up to about 2.3 percent by weight based on the total weight of the size. Particularly useful plasticizers have been found to be polyethylene glycols having an average molecular weight of about 300 sold by Union Carbide Corporation as CARBOWAX 300.

The protective colloids, which may be utilized in the sizing composition of the invention, enhance the stability and the homogeniety of the sizing composition. A typical protective colloid is polyvinylpyrrolidone used at a level of up to 5.6 percent based on the total weight of the size. At low levels the polyvinylpyrrolidone, around 1 percent based on the total weight of the size, primarily enhances the stability of the size, but at higher levels also imparts film forming properties to the size.

The invention will be further elucidated by the following examples:

DESCRIPTION OF PREFERRED EMBODIMENT

Example 1

A sizing composition is prepared having the following composition:

| Ingredients | Percent by Weight Based on the Total Weight of the Size | Percent by Weight Based on the Total Solids of the Sizing Composition |
| --- | --- | --- |
| Epoxy Resin | 3.4 to 11.5 | 38.0 to 64.0 |
| Reaction product of the partial ester of a polycarboxylic acid containing one or more unesterified carboxyl groups with a compound containing more than one epoxy group | .56 to 1.9 | 6.2 to 16. |
| Oxyalkylated Oxyalkylene glycol emulsifier | .41 to 1.4 | 4.6 to 7.8 |
| Oxyalkylated vegetable oil emulsifier | .41 to 1.4 | 4.6 to 7.8 |
| Alkylphenoxypolyalkylene oxyalkanol emulsifier | .22 to 0.8 | 2.2 to 4.4 |
| Protective colloid | up to 5.76 | up to 32 |
| Plasticizer | up to 2.3 | up to 12.8 |
| Methacryloxyalkyltrialkoxysilane | .25 to 1.6 | 2.8 to 8.8 |
| Gamma-glycidoxypropyltrimethoxy-silane coupling agent | .25 to 1.6 | 2.8 to 8.8 |
| Cationic lubricant | 0.5 to .32 | 0.3 to 1.8 |

The remainder of the sizing composition is water.

The desired pH range for the size is between 5.5 and 7.5 with an optimum solids concentration of 10.0 to 15.0 percent. After sizing the glass fiber strand has on the surface thereof approximately 0.3 to 0.7 percent of the sizing solids based on the weight of the size solids and the glass.

In preparing the sizing composition, the epoxy resin and the reaction product of the partial ester and the compound containing more than one epoxy group, the non-ionic surfactant and emulsifiers are charged to an emulsification tank equipped with an Eppenbach homogenizer or other appropriate high speed, high shear mixer. These ingredients are heated with agitation to 49° C. (120° F.); after all the ingredients are mixed thoroughly, hot water, 60° to 71° C. (140° to 160° F.) is added slowly to the emulsification tank. When an oil emulsion is formed, the water is continued to be added until about ½ of the total water to be added is incorporated into the emulsion.

In a premix tank, the required hot solution water, 60° to 71° C., for the polyvinylpyrrolidone solution is added and with vigorous agitation, the polyvinlypyrrolidone is added. This mixture is agitated for 15 minutes or until the solution is complete and then the solution is pumped to a main mix tank.

The emulsion produced in the previous step is then pumped into the main mix tank containing the polyvinylpyrrolidone solution. In a premix tank a solution of fatty acid amine is prepared by combining the required deionized water (60° to 71° C.) and adding the fatty acid amine and then agitating the mixture for 15 minutes or until the solution is complete. This solution is then added to the main mix tank containing the emulsion and the polyvinylpyrrolidone mixture.

An amount of silicone-based antifoaming agent is prepared by diluting with water and is added to the main mix tank. The methacryloxy methocryloxyalkyltrialkovysilane is added to an acetic acid-water solution and hydrolyzed producing a silane concentration of 5 percent solids or less. The solution is then added to the main mix tank. The glycidioxypropyltrimethoxysilane is added to an acetic acid-water solution to form a 5 percent solids aqueous solution and then added to the main mix tank. If a plasticizer is to be incorporated into the sizing composition, it is mixed with 21° to 27° C. (70°–80° F.) water and added to the main mix tank prior to the addition of the protective colloid. If the plasticizer is not water dispersible or soluble, it may be combined with the epoxy resin and emulsified therewith. The sizing composition is then diluted to the final volume with continued agitation.

After the high solids sizing composition has been formed as above, it is pumped in recirculating fashion to a binder applicator which applies the sizing composition to the filaments during formation. The fibers are formed in a conventional manner where the size is applied by belt type applicator, and the individual filaments are gathered into a strand, and the strand or strands are collected on a forming tube, which is mounted on a winder. Preferably, the winder and winding apparatus is such as to form a precision wound, square edge package of glass fiber strand or roving. The use of the high solids sizing composition reduces the amount of moisture that is contained in the treated glass fiber strand and reduces the necessity of drying the strand or glass fibers before and after they are wound into a precision, wound, square edge package.

The use of the high solids sizing composition on glass fibers reduces the necessity for drying the sized glass fibers before they are wound where the drying usually took place during the process of producing a precision wound, square edge package prior to the gathering of the filaments into strand form. In this process, the filaments were passed at drawing speeds through an oven and the dryers employed were either electric heaters, gas fired ovens or dielectric dryers. Typically, the temperature or energy output of the oven was adjusted to remove the requisite quantity of water from the filaments at a given drawing speed. In this operation, it was important to provide a drying zone of sufficient length with an energy output of sufficient intensity and specificity for absorption of water to insure that the strand removed therefrom had a moisture content of 8 percent by weight or less, and preferably 2 to 6 percent. For example, with the use of an electrically heated oven 3 feet long by 14 inches wide, a fan of 2,000 filaments of K 6.75 fibers could be dried from 12 percent moisture to less than 8 percent at drawing speeds of 3,000 feet per minute.

The use of the high solid sizing composition for treating the glass fibers reduces the amount of moisture in the sized glass fiber strand to a moisture content of 8% by weight or less without the need of drying strand or glass fibers before they are wound. This is preferably accomplished by using the high solids sizing composition in combination with suitable applicator speeds to obtain the required percent application of strand solids approximately around ½ the standard applicator speed which is usually in the range of around 10 ft./min. to around 90 ft./min. depending on whether a roll type or belt type applicator is used giving a ½ speed of or about 5 ft./min. to about 45 ft./min. After the package is formed, it is removed from the winder and dried in a forced air oven or a dielectric oven until substantially all the water is removed therefrom. This post drying can occur at reduced times or temperatures than conventionally used because there is less moisture to remove from a high solids sized glass fiber strand than conventionally sized strand. Subsequent to drying the sized glass fibers can be unwound and used directly for reinforcement, fabricated into chopped strand, woven and/or formed into roving or the like.

Two sizing compositions were prepared in a similar manner to the sizing composition prepared in Example 1. The formulations for these two sizing compositions are presented in the table below. The table also contains the solid contents of the size and the applicator speeds at which the size was applied to the glass fibers and the resulting percent LOI and percent moisture of the treated glass fiber strands.

TABLE I

|  | EXAMPLE II gms/liter (Wt. % of total solids size) | | EXAMPLE III gms/liter (Wt. % of total solids size) | | EXAMPLE IV gms/liter (Wt. % of total solids size) | |
| --- | --- | --- | --- | --- | --- | --- |
| EPON ® 828 (reaction product of bisphenol A and epichlorohydrin epoxy equivalent 185–195 | 65 | (43.4) | 69.2 | (51.6) | 95.4 | (43.1) |
| Reaction product of partial ester of maleic anhydride and monomethyl ether of polyethlene glycol reacted with 3,4-epoxycyclohexane carboxylate | 10.8 | (7.2) | 12.0 | (9.0) | 15.9 | (15.7) |
| Industrial ® FC-180 ethylene oxyalkylated propylene glycol Hydroxyl No. 6–10 | 7.9 | (5.3) | 8.1 | (6.0) | 11.7 | (5.3) |
| Emulphor ® 719 polyoxyethylene oxyalkalated vegetable oil | 7.9 | (5.3) | 8.1 | (6.0) | 11.7 | (5.3) |
| Igepal CA-630 octylphenoxy polyethyleneoxyethanol | 4.5 | (3.0) | 4.0 | (3.0) | 6.6 | (3.0) |
| 2-methacryloxypropyltriethoxysilane | 12.9 | (8.6) | 11.2 | (8.4) | 19 | (8.6) |
| 2-glycidoxypropyltrimethoxy silane | 7.4 | (5.0) | 6.6 | (4.9) | 10.8 | (4.9) |
| Fatty acid amide lubricant (Emery 6717) | .7 | (0.47) | .6 | (0.47) | 1.1 | (.48) |
| Polyvinylpyrrolidone | 32.5 | (21.8) | 14.3 | (10.6) | 47.7 | (21.6) |
| SAG - silicone defoaming agent | 0.2 | (—) | 0.2 | (—) | .32 | (.14) |
| Size % Solids | 14.5% | | 13.09% | | 22% | |
| Applicator speeds | | | | | | |
| (rpm) 5.80 (% LOI) (% Moisture) | (.36) | (1.72) | — | | (1.07) | (4.02) |
| 7.75 | (.41) | (1.40) | — | | — | |
| 10.33 | (.79) | (4.01) | (.47) | (3.31%) | — | |

From the results of Example 1, Example 2, and Example 3 presented in Table 1 it can be seen that the use of a high solids sizing composition reduces the percent of moisture in the sized glass fiber strands and allows the formation of precision wound glass fiber packages without the need of drying the glass fibers before they are wound.

The foregoing has described a sizing composition and a process for producing glass fiber strand or roving wherein the sizing composition is a high solids sizing composition having a solids content of about 9 to about 30 weight percent. The high solids sizing composition has a preferred range of total solids from about 10 to about 18 weight percent to permit the production of precision wound glass fiber packages without the use of a dryer for drying glass fiber strands before they are wound. The high solids sizing composition having a total solids content above 18 weight percent can be used with any standard glass fiber winding apparatus.

The sizing composition comprises a phenolic epoxy resin, the reaction product of the partial ester of a polycarboxylic acid containing one or more unesterified carboxyl groups with a compound containing more than one epoxy group and organo silane coupling agent or agents such as methacryloxyalkyltrialkoxy silane and/or glycidoxypropyltrimethoxy silane, and a non-ionic surface active agent or agents. The sizing composition yields treated size glass fiber strands and/or roving that is compatible with many polymer matrices to be reinforced with the treated glass fibers. The high solids content of the sizing composition substantially reduces the amount of moisture that is applied during the application of the sizing composition of the glass fibers. This minimizes the final drying requirements and significantly reduces the amount of waste of the sizing composition during the application of the sizing composition to glass fibers. This reduction of moisture also significantly reduces size migration within the treated glass fibers. These effects of reduced moisture content all aid in improving the overall efficiency of usage for the size composition.

What is claimed is:

1. In the process for producing precision wound packages of glass fiber strands comprising drawing glass fibers from molten cones of glass in a bushing, applying aqueous sizing composition to said fibers during formation, drying the sized glass fibers in an oven, to obtain fibers having a moisture content of 8 percent by weight or less, gathering the fibers into a strand or strands, collecting the stand or strands into a precision wound package of strand or roving, and drying the precision wound packages to reduce further the moisture content, the improvement comprising applying to said fibers an aqueous sizing composition to obtain glass fibers having a moisture content of 8 percent by weight or less without drying the glass fibers before they are gathered and collected into precision wound packages and to reduce the time or temperature conditions of drying the packages, wherein the aqueous sizing composition, comprises in percent by weight based on the total weight of the sizing composition:

3.4 to 11.5 of phenolic epoxy resin,
0.56 to 1.9 of the reaction product of a partial ester of a polycarboxylic acid containing one or more unesterified carboxyl groups with a compound containing more than one epoxy group,
1.04 to 3.6 of non-ionic surface active agents, about 0.5 to about 3.5 of one or more organosilane coupling agents,
up to 5.76 of polyvinylpyrrolidone, and the remainder of the aqueous composition being an amount of water to give a total solids content in the range of about 9 to about 30 weight percent.

2. The process of claim 1 wherein said epoxy resin has a molecular weight of less than 400.

3. The process of claim 1 wherein the reaction product of the partial ester of the polycarboxylic acid containing one or more unesterified carboxyl groups with the compound containing more than one epoxy group is the reaction product of maleic anhydride and the monomethyl ether of polyoxyethylene glycol said glycol having a molecular weight of 750, further reacted with 3,4-epoxycyclohexylmethyl 3,4-epoxycyclohexanecarboxylate.

4. The process of claim 1 wherein said organo silane coupling agent is gamma-methacryloxy propyltrimethoxy silane.

5. The process of claim 1 wherein the organo silane coupling agent is gamma-glycidoxypropyltrimethoxy silane.

6. The process of claim 1 wherein the one or more organo silane coupling agents are comprised of alpha methacryloxypropyltriethoxy silane and gamma-glycidoxy propyltrimethoxy silane.

7. The process of claim 1 wherein the sizing composition has up to about 2.3 percent by weight of polyoxyethylene glycol having a molecular weight of 250 to 600.

8. The process according to claim 1 wherein the sizing composition has about 0.05 to 0.32 percent of fatty acid amide lubricant.

9. The process according to claim 1 wherein the sizing is applied to the glass fibers from an applicator roll at a speed in the range of around 5 ft/min to about 45 ft/min.

* * * * *